United States Patent Office 3,108,128
Patented Oct. 22, 1963

3,108,128
TERTIARY ALKYL FERROCENES
Thomas Leigh, Macclesfield, England, assignor to Imperial Chemical Industries Limited, London, England, a corporation of Great Britain
No Drawing. Filed July 30, 1958, Ser. No. 751,833
Claims priority, application Great Britain Aug. 12, 1957
2 Claims. (Cl. 260—439)

This invention relates to new organic compounds and more particularly it relates to certain ferrocene derivatives which are useful as haematinics for the treatment of iron deficiency anaemia in man and animals.

Thus according to the invention we provide tertiary-alkylferrocenes of the formula:

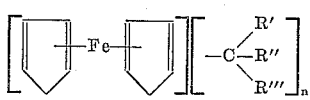

wherein R', R" and R'" stand for alkyl radicals and $n$ stands for an integer from 1 to 6.

Since dicyclopentadienyliron is known to the art as ferrocene, the compounds of the present invention can be regarded as mono-, di-, tri-, tetra-, penta- and hexa-alkyl-ferrocenes.

The essential feature of the structure of ferrocene is the symmetrical binding of the central metal atom to all five carbon atoms of each ring and the free rotation of the two rings relative to each other. Thus when each ring is substituted by a single substituent, there is only one possible structure for such disubstituted compounds and they are known as 1:1'-disubstituted compounds. When only one ring is substituted by two substituents, there are two possible structures for such disubstituted compounds and they are known as 1:2- or 1:3-disubstituted compounds. On the basis of the known art where the stability and properties of ferrocene are explained by the pentagonal antiprism configuration, the compounds of the present invention can be regarded as having the formula:

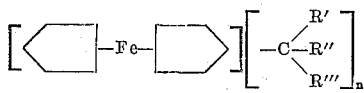

wherein R', R", R'" and $n$ have the meaning stated above.

As suitable compounds of the above stated formula there may be mentioned for example 1:1'-di-tertiary-butylferrocene, di-tertiary-butylferrocene, M.P. 61° C., tri-tertiary-butylferrocene, M.P. 91° C., tetra-tertiary-butylferrocene, M.P. 198° C., tetra-tertiary-amylferrocene, M.P. 110° C., 1:1'-di-tertiary-amylferrocene, and 1:1'-di-(1:1:3:3-tetramethylbutyl)-ferrocene.

According to a further feature of the invention we provide a process for the manufacture of the said ferrocene derivatives which comprises alkylation of ferrocene with tertiary alkyl halides.

Suitable alkyl halides may be tertiary-butyl chloride or tertiary-amyl chloride.

The reaction is preferably carried out in the presence of a catalyst which may be for example aluminium chloride or zinc chloride. There may also be present in the reaction medium, an inert diluent or solvent for example ethylene dichloride. The process is preferably carried out within the temperature range of 0–100° C. and by suitably adjusting the process conditions such as temperature and duration of reaction, ratios of reactants and catalyst used, it is possible to obtain the tertiary-alkylferrocenes, of the above stated formula, or mixtures thereof.

This process is particularly valuable for the preparation of 1:1'-di-tertiary-butylferrocene, by interaction of ferrocene and tertiary-butyl chloride in the presence of aluminium chloride as catalyst and in the presence of ethylene dichloride as diluent or solvent at a temperature of about 0–5° C.

According to a further feature of the invention we provide a process for the manufacture of the said ferrocene derivatives which comprises interaction of the corresponding tertiary-alkyl cyclopentadienyl alkali metal derivatives and an anhydrous iron halide.

The alkali metal derivatives may be for example the tertiary-alkyl cyclopentadienyl-sodium, -potassium or -lithium derivatives. The reaction is preferably carried out at a temperature of about 0–25° C. and in the presence of an inert diluent or solvent for example tetrahydrofuran or toluene. The preferred halides are the chlorides and bromides and either ferrous chloride or ferric chloride may be used as the latter is reduced to the ferrous state by the cyclopentadienyl alkali metal derivative. The said process is particularly valuable for the preparation of 1:1'-di-tertiary-butylferrocene, by interaction of tertiary-butyl cyclopentadienylsodium and ferrous chloride at a temperature of 0–25° C. and in the presence of tetrahydrofuran or toluene as solvent or diluent.

The tertiary-alkyl cyclopentadienylsodium derivatives used as starting material may conveniently be prepared according to the known art from the corresponding tertiary-alkylcyclopentadiene derivatives by reaction with finely-divided sodium in the presence of toluene as a diluent or by reaction with sodium in the presence of liquid ammonia as diluent and ferric nitrate as a catalyst. The tertiary-alkylcyclopentadiene derivatives themselves may be obtained by alkylation of the corresponding cyclopentadienyl magnesium halide with a tertiary-alkyl halide for example tertiary-butyl chloride.

According to a further feature of the invention we provide a process for the manufacture of the said new ferrocene derivatives which comprises interaction of the corresponding tertiary-alkylcyclopentadiene derivatives and an anhydrous iron halide such as anhydrous ferrous or ferric chloride or bromide in the presence of a strong organic base as an acid-binding agent.

A suitable strong organic base may be for example piperidine or diethylamine. The process is particularly useful for the manufacture of 1:1'-di-tertiary-butylferrocene from tertiary-butylcyclopentadiene and ferrous chloride in the presence of piperidine as an acid-binding agent.

The invention is illustrated but not limited by the following examples in which the parts are by weight:

*Example 1*

7.1 parts of powdered zinc chloride are added to a solution of 3.6 parts of ferrocene and 24 parts of tertiary-butyl chloride in 50 parts of ethylene dichloride. The mixture is stirred at 40° C. during five hours and it is then cooled to 25° C. and 150 parts of petroleum ether, B.P. 40–60° C., are added. The mixture is filtered and the solid residue is stirred with 50 parts of dilute aqueous hydrochloric acid. The mixture is filtered and the solid residue is washed free of acid and dried. It is crystallised from ethyl alcohol and there is thus obtained a tetra-tertiary-butylferrocene, M.P. 198° C.

*Example 2*

To a stirred solution of 3.6 parts of ferrocene and 24 parts of tertiary-butyl chloride in 50 parts of ethylene dichloride at 0° C. are added 1.3 parts of anhydrous aluminium chloride. The temperature of the reaction mixture is raised to 25° C. and after 20 hours, the mixture is poured on to 100 parts of crushed ice. The lower ethylene dichloride layer is separated and is washed first with dilute aqueous hydrochloric acid and then with dilute aqueous sodium hydroxide and finally with water. The ethylene dichloride is distilled at reduced pressure and the residue consists of a semi-solid mixture of tertiary-butylferrocenes. The main components of the mixture are tri-tertiary-butylferrocene and tetra-tertiary-butylferrocene and these are present in approximately equal amount. They may be separated by crystallisation from ethyl alcohol in which solvent the tetra-tertiary-butylferrocene is sparingly soluble or by chromatography using petroleum ether and alumina. There are thus obtained tetra-tertiary-butylferrocene, M.P. 198° C. and tri-tertiary-butylferrocene, M.P. 91° C.

*Example 3*

To a stirred solution of 3.6 parts of ferrocene and 5 parts of tertiary-butyl chloride in 100 parts of ethylene dichloride at 0° C. are added 3.1 parts of anhydrous aluminium chloride during fifteen minutes. The reaction mixture is stirred at 0–2° C. for a further one hour and it is then poured on to 100 parts of crushed ice. The ethylene dichloride layer is separated and it is then treated according to the method described in Example 2. There is thus obtained a mixture of tertiary-butylferrocenes. The mixture is separated by chromatography using petroleum ether and alumina. There are obtained a small amount of tri-tertiary-butylferrocene, M.P. 91° C., and approximately equal amounts of di-tertiary-butylferrocene, M.P. 61°, and the isomeric 1:1′-di-tertiary-butylferrocene, M.P. 28° C.

*Example 4*

To a stirred solution of 3.6 parts of ferrocene and 24 parts of tertiary-butyl chloride in 50 parts of ethylene dichloride at 10° C. are added 6.2 parts of aluminium chloride during fifteen minutes. The reaction mixture is stirred at 25° C. for a further one hour and is then poured on to 500 parts of crushed ice. The ethylene dichloride layer is separated and is washed successively with dilute aqueous hydrochloric acid, dilute aqueous sodium hydroxide and water. The ethylene dichloride is distilled at reduced pressure and the residue consists of a mixture of poly-tertiary-butylferrocenes. Distillation of this residue at a pressure of 0.5 mm. of mercury provides a mixture of poly-tertiary-butylferrocenes. This mixture is further fractionated and there is thus obtained a mixture of poly-tertiary-butylferrocenes, B.P. 90–110° C./0.5 mm., containing 11.4% by weight of iron and a mixture of poly-tertiary-butylferrocenes, B.P. 120–145° C./0.5 mm., containing 12.0% by weight of iron. Penta- and hexa-tertiary-butylferrocenes contain respectively 12.0% and 10.7% by weight of iron.

*Example 5*

To a stirred solution of 18.7 parts of ferrocene and 80 parts of tertiary-amyl chloride in 250 parts of ethylene dichloride at 3° C. are added 6.5 parts of anhydrous aluminium chloride during one hour. The mixture is stirred at 25° C. for a further 20 hours and is then poured on to 500 parts of crushed ice. The ethylene dichloride layer is separated and then treated according to the method described in Example 2. There is thus obtained a mixture of tertiary-amylferrocenes. The semi-solid mixture is triturated with a solution of 50 parts of acetone and 50 parts of ethyl alcohol. After cooling to 0° C. for two hours the mixture is filtered and the residue is crystallised from ethyl alcohol. There is obtained tetra-tertiary-amylferrocene, M.P. 110° C.

*Example 6*

92 parts of sodium are added gradually to 2000 parts of liquid ammonia containing 2 parts of ferric nitrate crystals and the mixture is stirred for one hour and then 530 parts of tertiary-butyl cyclopentadiene are added at −35° C. The mixture is stirred during two hours and then 1200 parts of tetrahydrofuran are added and the temperature of the mixture is then allowed to rise to 25° C. whereby most of the ammonia is removed by evaporation. The residue is cooled to 5–10° C. and 254 parts of anhydrous ferrous chloride are added during one hour. The mixture is stirred during twenty hours at 20–26° C. and it is then filtered. The filtrate is diluted with water and the mixture is cooled in ice and then filtered. The solid residue is crystallised from ethyl alcohol and there is thus obtained 1:1′-di-tertiary-butylferrocene M.P. 28° C.

The tertiary-butyl cyclopentadiene used as starting material may be obtained as follows:

A solution of 546 parts of ethyl bromide in 1800 parts of diethyl ether is added to a stirred suspension of 120 parts of magnesium turnings and 80 parts of diethyl ether during two hours. The mixture is stirred for a further one hour. 264 parts of cyclopentadiene are then added to the mixture over one hour and after stirring for a further 24 hours, 556 parts of tertiary-butyl chloride are added during 90 minutes. The reaction mixture is stirred for twenty-four hours and is then poured on to 5000 parts of crushed ice. The ethereal layer is separated and is washed with water and dried over anhydrous sodium sulphate. The ether is removed at reduced pressure and the residue is distilled and there is obtained tertiary-butyl cyclopentadiene, B.P. 45° C./28 mm.

*Example 7*

To a stirred suspension of 10 parts of finely divided sodium in 100 parts of toluene at 20–25° C. are added 53 parts of tertiary-butyl cyclopentadiene. The mixture is cooled to 5–10° C. and 27.6 parts of anhydrous ferrous chloride are added during one hour and after stirring during a further twenty-four hours at 20–25° C. the mixture is filtered. The filtrate is washed with water and the toluene is removed from the washed filtrate by distillation at reduced pressure. By distillation of the residue there is obtained 1:1′-di-tertiary-butylferrocene, B.P. 92° C./0.5 mm. and M.P. 28° C.

*Example 8*

A solution of 27 parts of tertiary-butyl cyclopentadiene in 34 parts of piperidine is added to a stirred mixture of 12.7 parts of anhydrous ferrous chloride and 100 parts of tetrahydrofuran at 10° C. The mixture is stirred at 20–25° C. during twenty hours and then at 65° C. during two hours. The reaction mixture is filtered and the filtrate is diluted with water to give a red oil which is purified by chromatography using petroleum ether and alumina. There is thus obtained 1:1′-di-tertiary-butylferrocene, M.P. 28° C.

*Example 9*

35 parts of sodium are added to 1000 parts of liquid ammonia containing 0.5 part of ferric nitrate crystals. The mixture is stirred for one hour and 204 parts of tertiary-amyl cyclopentadiene are added at −35° C. After stirring during a further two hours, 500 parts of tetrahydrofuran are added and the temperature is allowed to rise to 25° C. in order to remove most of the ammonia by evaporation. The residue is cooled to 5° C. and 97 parts of anhydrous ferrous chloride are added during one hour. The mixture is stirred at room temperature during twenty hours and is then filtered. The filtrate is diluted with water and the precipitated red oil is washed with water, dried over anhydrous sodium sulphate and distilled under reduced pressure. There is thus obtained 1:1′-di-tertiary-amylferrocene, B.P. 122° C./0.2 mm. and M.P. 0° C.

The tertiary-amyl cyclopentadiene used as the starting material in the above process may be prepared in the following manner. A solution of 378 parts of ethyl bromide in 700 parts of diethyl ether is added to a stirred suspension of 84 parts of magnesium turnings and 300 parts of diethyl ether during two hours. The mixture is stirred for a further one hour. 231 parts of cyclopentadiene are added during one hour and after stirring for a further 24 hours, 371 parts of tertiary-amyl chloride are added during ninety minutes. The mixture is stirred for twenty-four hours and is then poured on to 5000 parts of crushed ice. The ethereal layer is separated, washed with water and dried over anhydrous sodium sulphate. The ether is distilled at reduced pressure and by distillation of the residue there is obtained tertiary-amyl cyclopentadiene, B.P. 51° C. at 5 mm.

*Example 10*

11.5 parts of sodium are added to 300 parts of liquid ammonia containing 0.2 part of ferric nitrate crystals. 90 parts of (1:1:3:3-tetramethylbutyl) cyclopentadiene are added at −35° C. and the mixture is stirred during two hours. 300 parts of tetrahydrofuran are added and most of the ammonia is evaporated off by allowing the temperature of the mixture to rise to 25° C. The residual mixture is cooled to 5° C. and 32 parts of anhydrous ferrous chloride are added during one hour. The mixture is stirred for twenty hours at 20–25° C. and is then filtered. The filtrate is diluted with water and the resulting mixture is filtered and the solid residue is washed with water and crystallised from ethyl alcohol. There is thus obtained 1:1′-di-(1:1:3:3-tetramethylbutyl)ferrocene, M.P. 51° C.

The (1:1:3:3-tetramethylbutyl) cyclopentadiene used as the starting material in the foregoing example may be prepared in the following manner. A solution of 245 parts of ethyl bromide in 750 parts of diethyl ether is added to a stirred suspension of 56.2 parts of magnesium turnings and 220 parts of diethyl ether during ninety minutes. The mixture is stirred for a further one hour. 154 parts of cyclopentadiene are added during thirty minutes and after stirring for a further twenty-four hours the mixture is cooled to 0° C. and 348 parts of 2:4:4-trimethyl-2-chloropentane are added during three hours. The mixture is stirred at 20–25° C. for two hours and it is then poured on to 3000 parts of crushed ice. The ethereal layer is separated and is washed with water and dried over anhydrous sodium sulphate. The ether is distilled at reduced pressure and by distillation of the residue there is obtained (1:1:3:3 - tetramethylbutyl) cyclopentadiene, B.P. 35° C. at 0.1 mm.

*Example 11*

To a stirred solution of 7.4 parts of ferrocene and 21 parts of 2:4:4-trimethyl-2-chloropentane in 100 parts of ethylene dichloride at 0° C. are added 6.2 parts of anhydrous aluminium chloride during fifteen minutes. The mixture is stirred at 25° C. during a further four hours and it is then poured on to 500 parts of crushed ice. The ethylene dichloride layer is separated and is then treated according to the process described in Example 2. There is obtained a mixture of poly-octylferrocenes as a red oil.

What I claim is:

1. Tertiary-alkylferrocenes of the formula:

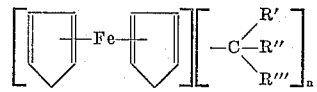

wherein R′, R″ and R″ stand for alkyl radicals containing not more than eight carbonations and $n$ stands for an integer from 1 to 6.

2. A compound selected from the group consisting of 1:1′-di-tertiary-butylferrocene, di-tertiary-butylferrocene, M.P. 61° C., tri-tertiary-butylferrocene, M.P. 91° C., tetra-tertiary-butylferrocene, M.P. 198° C., tetra-tertiary-amylferrocene, M.P. 110° C., 1:1′-di-tertiary-amylferrocene and 1:1′-di-(1:1:3:3-tetramethylbutyl)ferrocene.

References Cited in the file of this patent

UNITED STATES PATENTS

| | | |
|---|---|---|
| 2,763,613 | Scott et al. | Sept. 18, 1956 |
| 2,834,796 | Barusch et al. | May 13, 1958 |

OTHER REFERENCES

Rosenblum: Thesis on Ferrocence, deposited for use in Harvard's Main Library, February 19, 1954.

Cotton: Progress in Inorganic Chemistry, page 78 (1959).

Woodward et al.: J.A.C.S., volume 74, pp. 3458–3459, July 1952.

Groggins: "Unit Processes in Organic Synthesis," 3rd ed., (1947), pp. 720–724.